US012614825B2

(12) United States Patent
Ren et al.

(10) Patent No.: US 12,614,825 B2
(45) Date of Patent: Apr. 28, 2026

(54) PHASE SHIFTER ASSEMBLY, CAVITY PHASE SHIFTER WITH PHASE SHIFTER ASSEMBLY AND BASE STATION ANTENNA

(71) Applicant: Outdoor Wireless Networks LLC, Richardson, TX (US)

(72) Inventors: Yuanpeng Ren, Suzhou (CN); Changfu Chen, Suzhou (CN); Shuguang Shao, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 482 days.

(21) Appl. No.: 18/150,332

(22) Filed: Jan. 5, 2023

(65) Prior Publication Data

US 2023/0253710 A1 Aug. 10, 2023

(30) Foreign Application Priority Data

Feb. 10, 2022 (CN) ......................... 202210123337.6

(51) Int. Cl.
*H01P 1/397* (2006.01)
*H01P 1/18* (2006.01)
*H01Q 3/32* (2006.01)

(52) U.S. Cl.
CPC .............. *H01P 1/184* (2013.01); *H01P 1/182* (2013.01); *H01P 1/397* (2013.01); *H01Q 3/32* (2013.01)

(58) Field of Classification Search
CPC .. H01P 1/182; H01P 1/18; H01P 1/184; H01P 1/397
USPC ........................................ 333/24.1, 159, 256
See application file for complete search history.

(56) References Cited

U.S. PATENT DOCUMENTS

| | | | |
|---|---|---|---|
| 2015/0357696 | A1 | 12/2015 | Iso et al. |
| 2017/0069941 | A1 | 3/2017 | Liu et al. |

FOREIGN PATENT DOCUMENTS

| | | | |
|---|---|---|---|
| CN | 109755696 | A | 5/2019 |
| JP | 2017152793 | A | 8/2017 |
| KR | 20120132802 | A | 12/2012 |

OTHER PUBLICATIONS

“International Search Report and Written Opinion corresponding to International Application No. PCT/US2023/061209 mailed May 23, 2023”.

“International Preliminary Report on Patentability corresponding to International Application No. PCT/US2023/061209 mailed Aug. 22, 2024”.

*Primary Examiner* — Rakesh B Patel
(74) *Attorney, Agent, or Firm* — Myers Bigel, P.A.

(57) ABSTRACT

The present disclosure relates to a phase shifter assembly comprising a phase shift circuit and a dielectric assembly having at least one dielectric element movable relative to the phase shift circuit for phase shifting, wherein the at least one dielectric element is disposed at a set distance from the phase shift circuit to form a gap between the at least one dielectric element and the phase shift circuit. In addition, the present disclosure also relates to a cavity phase shifter and a base station antenna.

20 Claims, 7 Drawing Sheets

PHASE SHIFTER ASSEMBLY, CAVITY PHASE SHIFTER WITH PHASE SHIFTER ASSEMBLY AND BASE STATION ANTENNA

RELATED APPLICATION

The present application claims priority from and the benefit of Chinese Patent Application No. 202210123337.6, filed Feb. 10, 2022, the disclosure of which is hereby incorporated by reference herein in full.

FIELD OF THE INVENTION

The present disclosure relates to the field of radio communication technology in general, and more specifically, to a phase shifter assembly, a cavity phase shifter with phase shifter assembly, and a base station antenna.

BACKGROUND OF THE INVENTION

In cellular communication systems, electrically-adjustable base station antennas (remote electrical tilt [RET] antennas) are widely used. Before the introduction of RET antennas, when it was necessary to adjust the coverage area of traditional base station antennas, technicians had to physically climb up the antenna tower where the antenna was installed and manually adjust the directional angle of the antenna. Typically, the coverage area of an antenna is adjusted by changing the so-called "downtilt" angle of the antenna. The introduction of RET antennas allows cellular operators to electrically adjust the downtilt angle of the antenna beam by sending control signals to the antenna. The RET antenna is capable of applying different phase shifts to different sub-components of the RF signal by means of phase shifters, thereby adjusting the downtilt angle of the antenna beam formed by the array of radiating elements.

Various types of cavity phase shifters, such as sliding dielectric phase shifters, are known in the art to be widely used in base station antennas. In cavity phase shifters, the phase shifter is enclosed within a grounded metal housing. The cavity phase shifter may have a phase shift circuit and a dielectric element slidable relative to the phase shift circuit. By moving the dielectric element relative to the phase shift circuit, the coverage area or length of the dielectric element on the different branches of the phase shift circuit may be changed, thereby achieving different phase shifts along the different branches of the phase shift circuit. In existing designs of cavity phase shifters, the dielectric element is typically placed in close contact with the phase shift circuit, that is, with zero gap between them.

SUMMARY OF THE INVENTION

Therefore, it is an object of the present disclosure to provide a phase shifter assembly, a cavity phase shifter with the phase shifter assembly, and a base station antenna capable of overcoming at least one drawback in the prior art.

According to a first aspect of the present disclosure, a phase shifter assembly is provided, wherein the phase shifter assembly comprises a phase shift circuit and a dielectric assembly having at least one dielectric element movable relative to the phase shift circuit for phase shifting, and wherein the at least one dielectric element is disposed at a set distance from the phase shift circuit to form a gap between the at least one dielectric element and the phase shift circuit.

According to a second aspect of the present disclosure, a phase shifter assembly is provided, wherein the phase shifter assembly comprises a phase shift circuit and a dielectric assembly having at least one dielectric element movable relative to the phase shift circuit for phase shifting; wherein the at least one dielectric element comprises a first dielectric component and a second dielectric component on opposite sides of the phase shift circuit; wherein the first dielectric component and the second dielectric component respectively comprise a dielectric base and bosses and/or protruding ribs protruding from the dielectric base towards one another; and wherein the first dielectric component and the second dielectric component are respectively spaced apart from the phase shift circuit by a set distance by means of the bosses and/or protruding ribs.

According to a third aspect of the present disclosure, a cavity phase shifter is provided, comprising a phase shifter cavity, wherein the phase shifter assembly described above is provided in the phase shifter cavity.

According to a fourth aspect of the present disclosure, a base station antenna is provided, which comprises the cavity phase shifter.

BRIEF DESCRIPTION OF THE FIGURES

The present disclosure will be explained in greater detail by means of specific embodiments with reference to the attached drawings. The schematic drawings are briefly described as follows.

Figure 1:
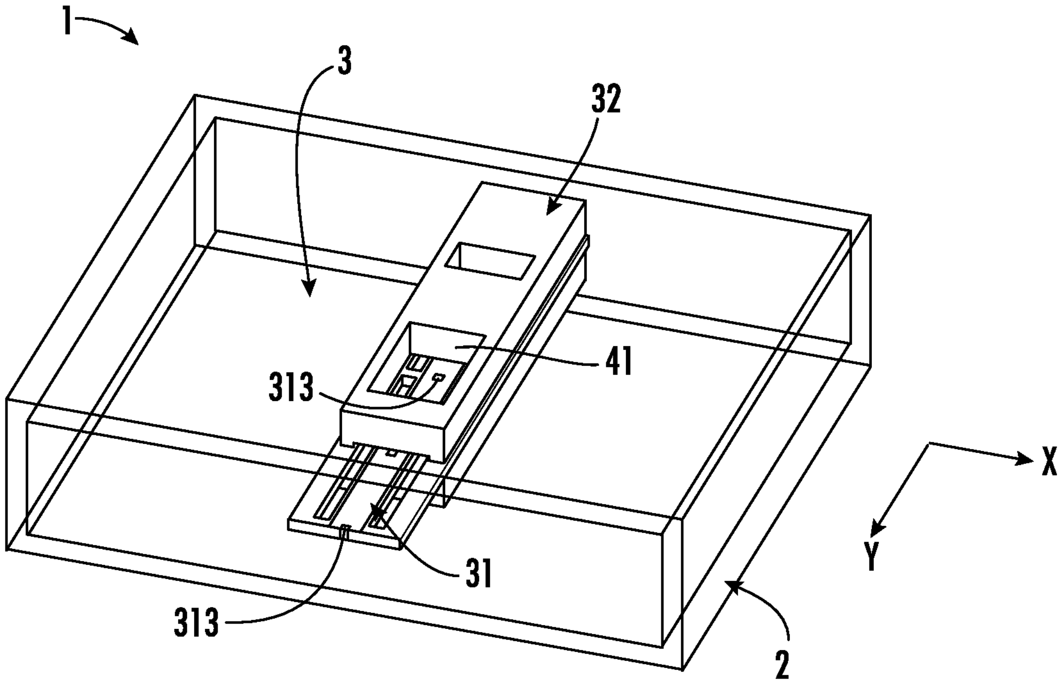
FIG. 1 is a schematic perspective view of a cavity phase shifter according to some embodiments of the present disclosure, wherein the cavity phase shifter comprises a phase shifter assembly according to some embodiments of the present disclosure.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the position, size, range, etc. disclosed in the attached drawings.

DETAILED DESCRIPTION OF SPECIFIC EMBODIMENTS

The present disclosure will be described below with reference to the attached drawings, which show several examples of the present disclosure. However, it should be understood that the present disclosure can be presented in many different ways and is not limited to the examples described below. In fact, the examples described below are intended to make the present disclosure more complete and to fully explain the protection scope of the present disclosure to those skilled in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this Specification, elements, nodes or features that are "connected" together may be mentioned. Unless explicitly stated otherwise, "connected" means that one element/node/feature can be mechanically, electrically, logically or otherwise connected with another element/node/feature in a direct or indirect manner to allow interaction, even though the two features may not be directly connected. That is, "connected" means direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or specific embodiments.

As used herein, the word "substantially" means including any minor changes caused by design or manufacturing defects, device or component tolerances, environmental influences, and/or other factors. The word "substantially" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

Embodiments of the present disclosure will now be described in greater detail with reference to the accompanying drawings.

Figure 2:
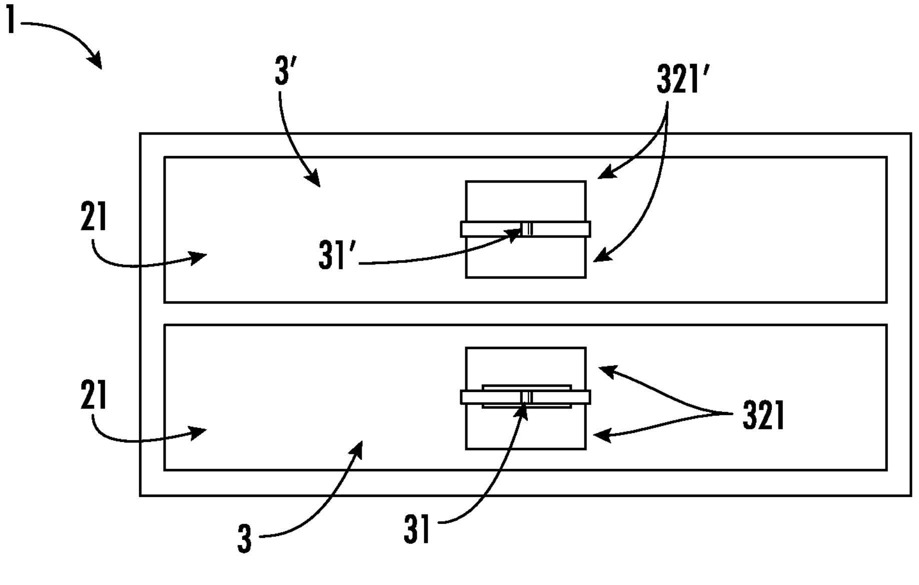
FIG. 2 is a schematic comparison diagram of a side view of the phase shifter assembly in FIG. 1 and a phase shifter assembly according to the prior art.

FIG. 1 shows a schematic perspective view of a cavity phase shifter according to some embodiments of the present disclosure, wherein the cavity phase shifter comprises a phase shifter assembly according to some embodiments of the present disclosure. FIG. 2 shows a schematic comparison diagram of a side view of the phase shifter assembly in FIG. 1 and a phase shifter assembly according to the prior art.

As shown in FIG. 1, a cavity phase shifter 1 according to the present disclosure comprises a cavity 2 defined by a grounded metal housing, e.g., an aluminum alloy housing, and a phase shifter assembly 3 disposed in the cavity 2. The metal housing may have one or more cavities 21 for accommodating the phase shifter assembly 3 (see FIG. 2). The metal housing is configured as the GND of the phase shift circuit 31 of the phase shifter to realize the RF-signal transmission. The phase shifter assembly 3 may comprise a phase shift circuit 31 and a dielectric assembly 32 having a dielectric element 321 movable relative to the phase shift circuit 31 for phase shifting, e.g., translationally. By moving the dielectric element 321 relative to the phase shift circuit 31, the coverage area or length of the dielectric element 321 on the different branches of the phase shift circuit may be changed, thereby achieving different phase shifts along the different branches of the phase shift circuit. More details on the phase shifter assembly 3 according to the present disclosure will be described below with the aid of FIGS. 3A to 9.

Hereon, the difference between the phase shifter assembly 3 according to the present disclosure and the phase shifter assembly 3' according to the prior art is explained with the aid of FIG. 2, wherein the phase shifter assembly 3 according to the prior art is shown in the upper part of FIG. 2, while the phase shifter assembly 3 according to the present disclosure is shown in the lower half of FIG. 2. As shown in the upper part of FIG. 2, in the phase shifter assembly 3' according to the prior art, the dielectric element 321' and the phase shift circuit 31' are disposed in abutment with each other, that is, the gap between them is zero. However, the inventor found that: due to dimensional errors of the dielectric element 321' arising from factors such as manufacturing tolerance and/or usage loss, the dielectric element 321' and the phase shift circuit 31' may be spaced apart from each other in some areas or positions, that is, the gap between them may be non-zero. This step change from zero gap to non-zero gap may result in large phase deviations that negatively affect the phase-shifting performance of the cavity phase shifter, especially the phase-shifting performance in high operating frequency bands, such as 5 GHz or higher operating frequency bands. This is unwanted.

In order to overcome the above drawback in the prior art, the present disclosure provides a new phase shifter assembly 3. As shown in the lower half of FIG., the dielectric element 321 of the phase shifter assembly 3 according to the present disclosure is disposed at a set distance from the phase shift circuit 31. In other words, a non-zero gap is intentionally and artificially set between the dielectric element 321 and the phase shift circuit 31. Since there is always a non-zero gap between the dielectric element 321 and the phase shift circuit 31, an undesired step change from zero gap to non-zero gap is avoided, so the impact of a dimensional error of the dielectric element 321 on the phase-shifting performance of the cavity phase shifter 1 becomes smaller. Furthermore, advantageously, in order to avoid the situation of a change from non-zero gap to zero gap, the distance between the dielectric element 321 and the phase shift circuit 31 may be set to be greater than a dimensional error of the dielectric element 321. For example, the distance between the dielectric element 321 and the phase shift circuit 31 may be set to be greater than the manufacturing tolerance of the dielectric element, e.g., two, three, five, or even ten times greater than the manufacturing tolerance of the dielectric element.

In some embodiments, the set distance between the dielectric element 321 and the phase shift circuit 31 may remain constant (ignoring the manufacturing tolerances) over the longitudinal extension Y of the dielectric element 321. In some embodiments, the set distance between the dielectric element 321 and the phase shift circuit 31 may vary, e.g. linearly vary over the longitudinal extension Y of the dielectric element 321.

Such a phase shifter assembly 3 is described in greater detail below with the aid of FIGS. 3A to 9.

Figure 3A:
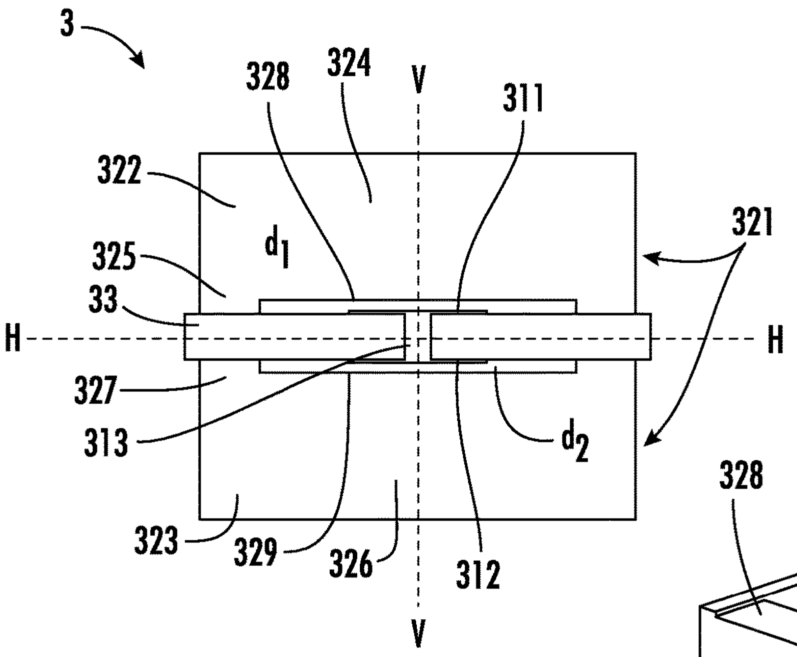
FIG. 3A is a side view of a phase shifter assembly of the cavity phase shifter in FIG. 1.
Figure 3B:
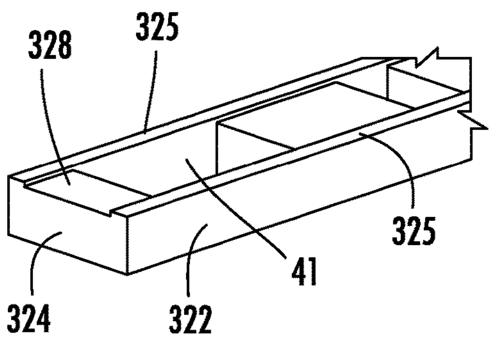
FIG. 3B is a detailed perspective view of one of the dielectric components of the dielectric element of the phase shifter assembly in FIG. 3A.

FIG. 3A shows a side view of a phase shifter assembly 3 of the cavity phase shifter 1 in FIG. 1, and FIG. 3B is a detailed perspective view of one of the dielectric components of the dielectric element 321 of the phase shifter assembly 3 in FIG. 3A;

As shown in FIG. 3A, the phase shifter assembly 3 according to the present disclosure may comprise a printed circuit board 33, a phase shift circuit 31 configured on the printed circuit board 33, and a dielectric element 321 movable relative to the phase shift circuit 31. The phase shift circuit 31 may be configured as printed traces on the printed circuit board 33. To create a symmetrical and balanced structure, the printed traces may comprise a first trace 311 and a second trace 312 printed on opposite sides of the printed circuit board 33, respectively. The first trace 311 and the second trace 312 are capable of engaging each other through at least one metallized via 313. Correspondingly, the dielectric element 321 may comprise a first dielectric component 322 on the side of the first trace 311 of the phase shift circuit 31 and a second dielectric component 323 on the side of the second trace 312 of the phase shift circuit 31. The first dielectric component 322 and the second dielectric component 323 are configured to be slidable relative to the printed circuit board 33 and thus relative to the phase shift circuit 31 on the printed circuit board 33, thereby realizing phase shifting. Furthermore, the first dielectric component 322 and the second dielectric component 323 may be fixedly connected to each other by means of a fastening mechanism, e.g. by means of a snap fastener, in order to achieve synchronous movement and good phase-shifting performance.

As shown in FIGS. 3A and 3B, the first dielectric component 322 may comprise a first dielectric base 324 and first protruding ribs 325 protruding towards the second dielectric component 323 from two side regions in the transverse direction X of the first dielectric base 324. Similarly, the second dielectric component 323 may comprise a second dielectric base 326 and second protruding ribs 327 protruding towards the first dielectric component 322 from two side regions in the transverse direction X of the second dielectric base 326. The first protruding ribs 325 and the second protruding ribs 327 may extend along the longitudinal extension direction Y from the first end of the corresponding dielectric bases to the opposite second end. In some embodiments, the first protruding ribs 325 and the second protruding ribs 327 may be integrally formed with the first dielectric base 324 and the second dielectric base 326, respectively. In other embodiments, the first protruding ribs 325 and the second protruding ribs 327 may also be mounted on the first dielectric base 324 and the second dielectric base 326, respectively. The first dielectric component 322 and the second dielectric component 323 may abut the printed circuit board 33 by means of the first protruding ribs 325 and the second protruding ribs 327, respectively. That is, the printed circuit board 33 may be supported between the first protruding ribs 325 of the first dielectric component 322 and the second protruding ribs 327 of the second dielectric component 323 such that the first dielectric component 322 and the second dielectric component 323 may be spaced apart from the first trace 311 and the second trace 312 on the printed circuit board 33 by a set distance, respectively, thereby reducing or even eliminating the aforementioned undesired step change from zero gap to non-zero gap. Furthermore, compared with the phase shifter assembly 3 shown in FIG. 2 according to the prior art, the phase shifter assembly 3 according to the present disclosure is capable of reducing the contact area between the dielectric element 321 and the printed circuit board 33, thereby reducing frictional losses. Therefore, the risk of the dielectric element 321 being stuck and unable to achieve phase shifting may be reduced.

In some embodiments, as shown in FIG. 3A, on the sides facing each other, the first intermediate region 328 in the transverse direction of the first dielectric base 324 and the second intermediate region 329 in the transverse direction of the second dielectric base 326 may be spaced apart from the first trace 311 and the second trace 312 by a set distance, respectively, and the first trace 311 and the second trace 312 may be within the gap between the first intermediate region 328 and the second intermediate region 329. Hereon, the first intermediate region 328 and the second intermediate region 329 may be spaced apart from the first trace 311 and the second trace 312 by a set distance over their entire extension lengths in the longitudinal extension direction Y, respectively.

In order to facilitate the construction of a symmetrical and balanced electromagnetic coupling environment for the phase shift circuit 31, in the embodiment shown in FIG. 3A, the dielectric element 321 and the phase shift circuit 31 may be respectively configured to be not only mirror-symmetrical with respect to the vertical plane V-V, but also mirror-symmetrical with respect to the horizontal plane H-H. To this end, the first dielectric component 322 and the second dielectric component 323 of the dielectric element 321 may have identical and mirror-symmetrical outer contours with respect to the vertical plane V-V, and they may be made of dielectric materials with the same dielectric constant. Similarly, the first trace 311 and the second trace 312 of the phase shift circuit 31 may have substantially congruent and mirror-symmetrical surface profiles with respect to the vertical plane V-V, and they may be made of the same conductive material. Furthermore, in a direction perpendicular to the phase shift circuit 31 (here, a vertical direction), the phase shift circuit 31 may be centrally disposed within the gap between the first intermediate region 328 and the second intermediate region 329. That is, in the vertical direction, the first distance d1 by which the first trace 311 of the phase shift circuit 31 is spaced from the first intermediate region 328 is substantially equal to the second distance d2 between the second trace 312 of the phase shift circuit 31 and the second intermediate region 329. The first distance d1 and the second distance d2 may be set to be greater than a dimensional error of the dielectric element 321. Hereon, the first distance d1 and the second distance d2 may be, for example, at least 0.05 mm, 0.1 mm, 0.15 mm, 0.2 mm, 0.25 mm or 0.3 mm.

In some embodiments, as shown in FIGS. 3A and 3B, at least one hollow portion 41 for impedance matching may be provided in the free end region of the dielectric element 321 to expose a part of the phase shift circuit 31.

Figure 4A:
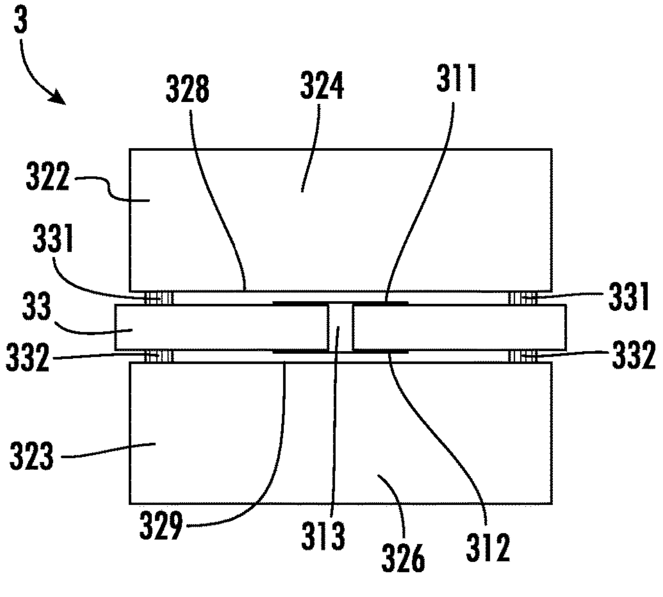
FIG. 4A is a side view of a phase shifter assembly according to further embodiments of the present disclosure.
Figure 4B:
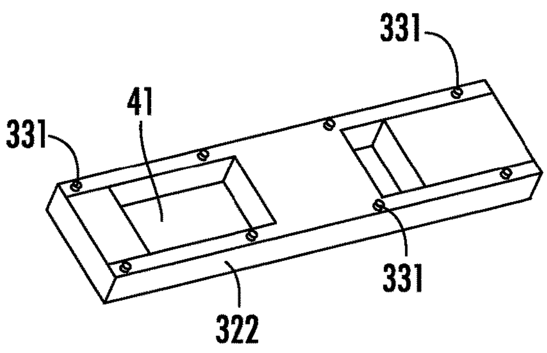
FIG. 4B is a detailed perspective view of one of the dielectric components of the dielectric element of the phase shifter assembly of FIG. 4A.

FIG. 4A shows a side view of a phase shifter assembly 3 according to further embodiments of the present disclosure, and FIG. 4B shows a detailed perspective view of one of the dielectric components of the dielectric element 321 of the phase shifter assembly 3 of FIG. 4A.

In the embodiment as shown in FIG. 4A, instead of the first protruding ribs 325 in FIG. 3A, the first dielectric component 322 is configured with two rows of first bosses 331 protruding from two side regions in the transverse direction of the first dielectric base 324 towards the second dielectric component 323. Similarly, instead of the second protruding ribs 327 in FIG. 3A, the second dielectric component 323 is configured with two rows of second bosses 332 protruding from the side regions in the transverse direction of the second dielectric base 326 towards the first dielectric component 322. Advantageously, the first row of bosses and the second row of bosses may be arranged in correspondence with each other. In some embodiments, the first row of bosses and the second row of bosses may be integrally formed with the first dielectric base 324 and the second dielectric base 326, respectively. In other embodiments, the first row of bosses and the second row of bosses may also be mounted on the first dielectric base 324 and the second dielectric base, respectively. The first dielectric component 322 and the second dielectric component 323 may abut the printed circuit board 33 by means of the first row of bosses and the second row of bosses, respectively. That is, the printed circuit board 33 may be supported between the first row of bosses of the first dielectric component 322 and the second row of bosses of the second dielectric component 323 such that the first dielectric component 322 and the second dielectric component 323 may be spaced apart from the first trace 311 and the second trace 312 on the printed circuit board 33 by a set distance, respectively, thereby reducing or even eliminating the aforementioned undesired step change from zero to non-zero gap. As a result, the contact area between the dielectric element 321 and the printed circuit board 33 and thus the frictional losses may be reduced, which in turn reduces the risk of the dielectric element 321 being stuck.

Figure 5A:
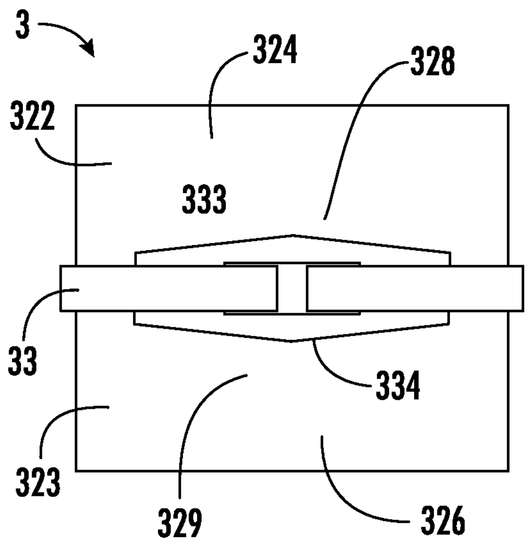
FIG. 5A is a side view of a phase shifter assembly according to further embodiments of the present disclosure.
Figure 5B:
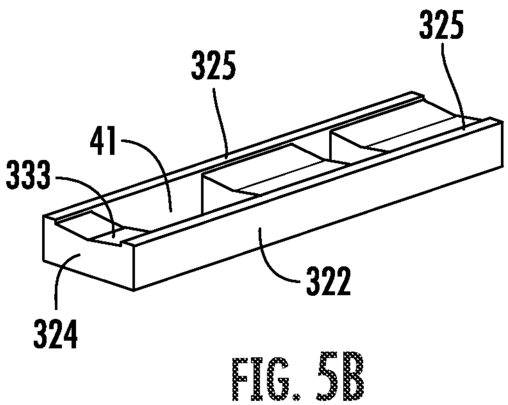
FIG. 5B is a detailed perspective view of one of the dielectric components of the dielectric element of the phase shifter assembly of FIG. 5A.

FIG. 5A shows a side view of a phase shifter assembly 3 according to further embodiments of the present disclosure, and FIG. 5B shows a detailed perspective view of one of the dielectric components of the dielectric element 321 of the phase shifter assembly 3 of FIG. 5A.

Unlike the embodiment in FIG. 3A, in the embodiment shown in FIG. 5A, the first intermediate region 328 of the first dielectric base 324 and the second intermediate region 329 of the second dielectric base 326 are respectively provided with a first concave portion 333 and a second concave portion 334. The first concave portion 333 and the second concave portion 334 are capable of ensuring that the desired spacing is maintained between the corresponding dielectric components and the phase shift circuit on the printed circuit board, thereby reliably reducing or even eliminating the aforementioned undesired step change from zero gap to non-zero gap. In some embodiments, the first concave portion 333 and the second concave portion 334 may have substantially the same profile, e.g., the triangular profile in FIG. 5A. However, it is conceivable that the first concave portion 333 and the second concave portion 334 may also have other profiles, such as arcuate or rectangular, or the like.

Figure 6:
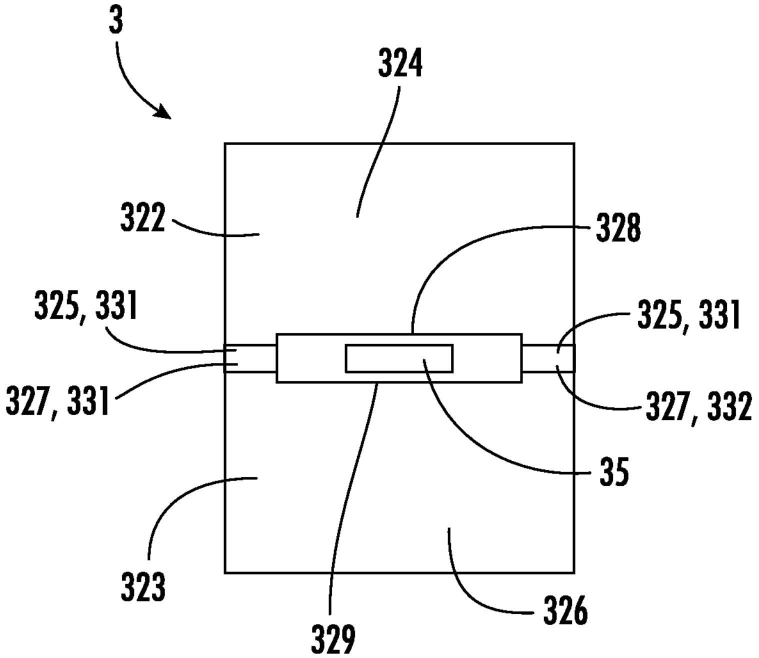
FIG. 6 is a side view of a phase shifter assembly according to further embodiments of the present disclosure.

FIG. 6 shows a side view of a phase shifter assembly 3 according to further embodiments of the present disclosure.

Unlike the embodiment shown in FIGS. 4A and 4B, in the embodiment shown in FIG. 6, the phase shift circuit 31 is configured as a metal-sheet circuit 35. Instead of the printed circuit board 33, the metal-sheet circuit 35 may be fixed by means of a dielectric support, such as a plastic support, which is not shown. To this end, for example, one or more lug-like structures for fixing may be formed in the side regions in the transverse direction of the metal-sheet circuit. Furthermore, since the printed circuit board 33 is not used, the first dielectric component 322 and the second dielectric component 323 of the dielectric element 321 may directly abut each other with their protruding ribs or bosses.

Figure 7A:
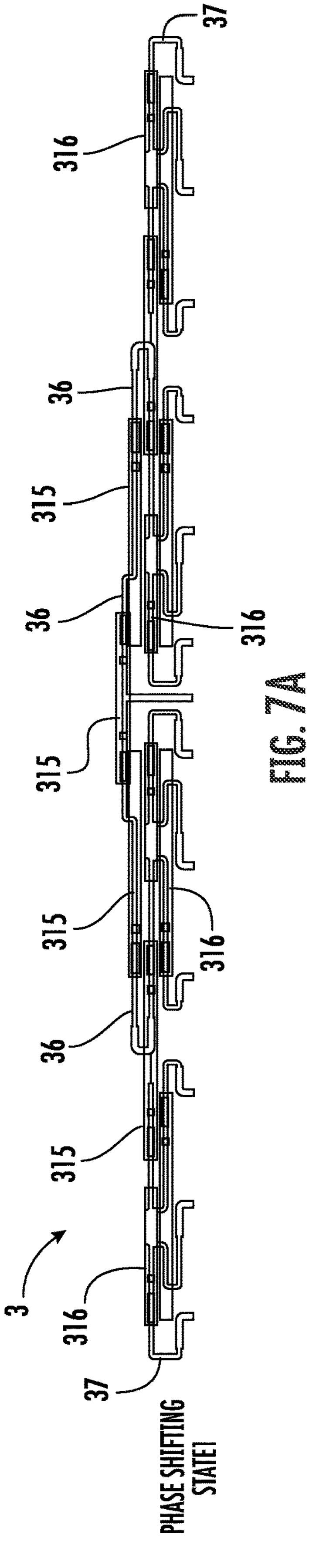
FIGS. 7A, 7B, and 7C are perspective views of a phase shifter assembly in different phase shifting states, respectively, according to further embodiments of the present disclosure.
Figure 7B:
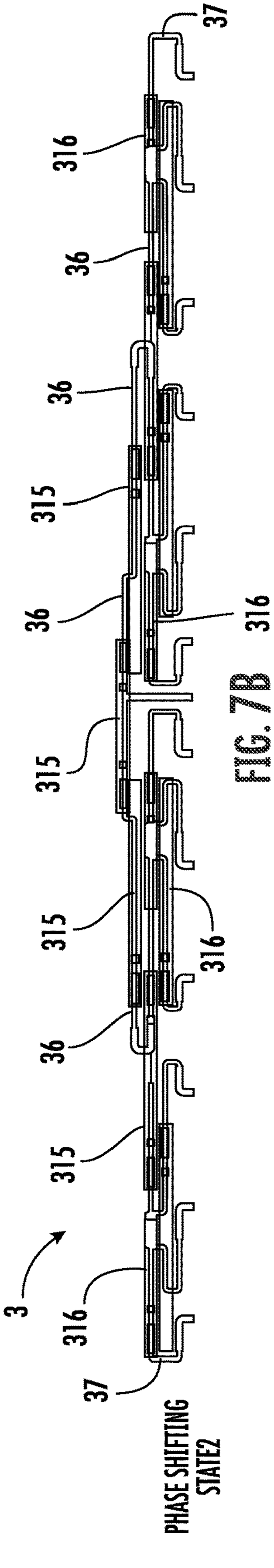
Figure 7C:
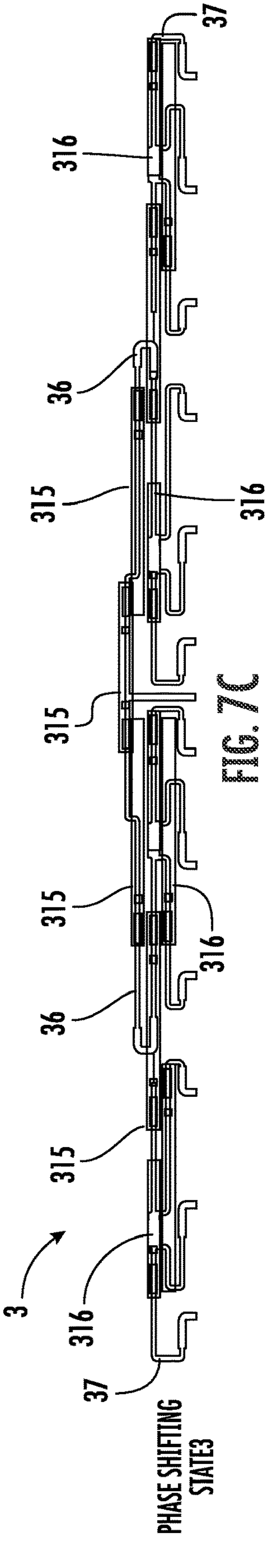
Figure 8A:
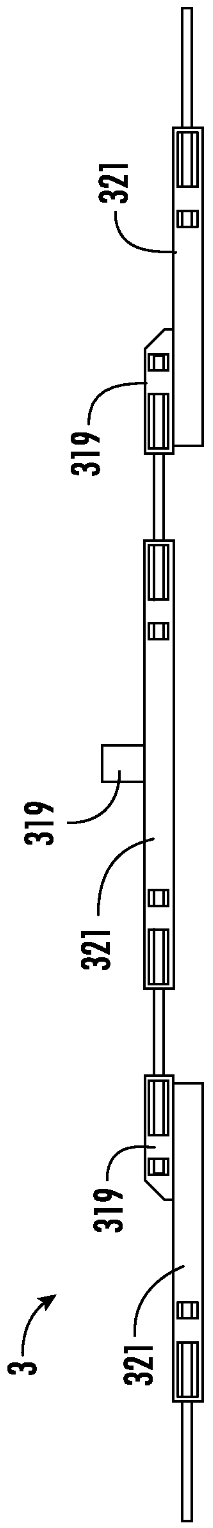
FIGS. 8A, 8B and 8C are partial perspective views of the phase shifter assembly of FIGS. 7A, 7B and 7C, respectively.
Figure 8B:
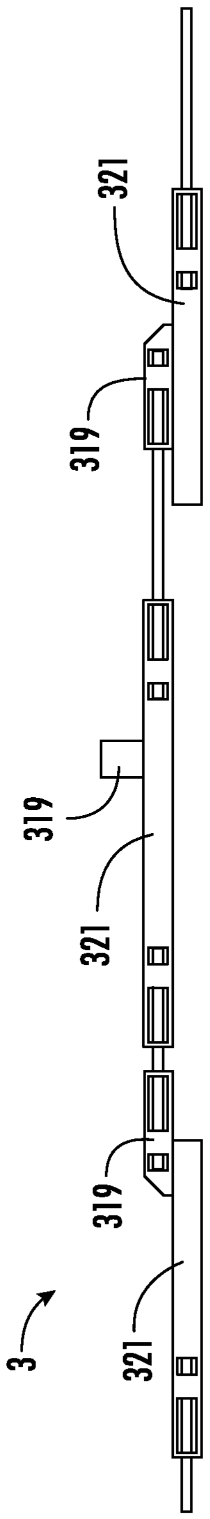
Figure 8C:
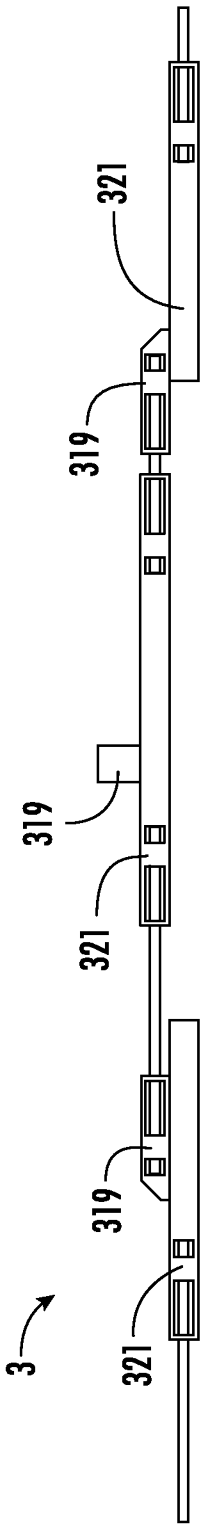

FIGS. 7A, 7B, and 7C show perspective views of a phase shifter assembly 3 in different phase shifting states, respectively, according to further embodiments of the present disclosure. FIGS. 8A, 8B and 8C show partial perspective views of the phase shifter assembly 3 of FIGS. 7A, 7B and 7C, respectively.

As shown in FIGS. 7A, 7B and 7C, the phase shift circuit 31 may be a single-input multiple-output phase shift circuit 31. To this end, the phase shift circuit 31 may comprise a multi-stage power-dividing network. In the illustrated embodiment, the phase shift circuit 31 may comprise a 1:2 power divider circuit section 36 and a 1:3 power divider circuit section 37. The 1:2 power divider circuit section 36 may be provided with a first dielectric element 315 that is movable relative to it. The 1:3 power divider circuit section 37 may be provided with a second dielectric element 316 that is movable relative to it. The first dielectric element 315 and the second dielectric element 316 may be made of dielectric materials having different dielectric constants and/or thicknesses. In addition, the first dielectric element 315 and the second dielectric element 316 may be configured to move synchronously relative to the phase shift circuit 31, thereby achieving different phase shifting states, such as the phase shifting states 1 to 3 in FIGS. 7A to 7C.

As shown in FIGS. 8A, 8B and 8C, in addition to the dielectric element 321 that is movable relative to the phase shift circuit 31, the dielectric assembly 32 may also have an impedance-matched dielectric member 319 that is fixed relative to the phase shift circuit 31. In some embodiments, for example, at least one impedance-matched dielectric member may be disposed between every two dielectric elements, so as to effectively achieve a smooth transition from one dielectric element to another, thereby improving the radio frequency performance of the phase shifter, such as echo return loss performance. Similar to the dielectric element 321, a hollow portion 41 may also be provided in the free end region of the impedance-matched dielectric member 319 to expose a part of the phase shift circuit 31.

Figure 9A:
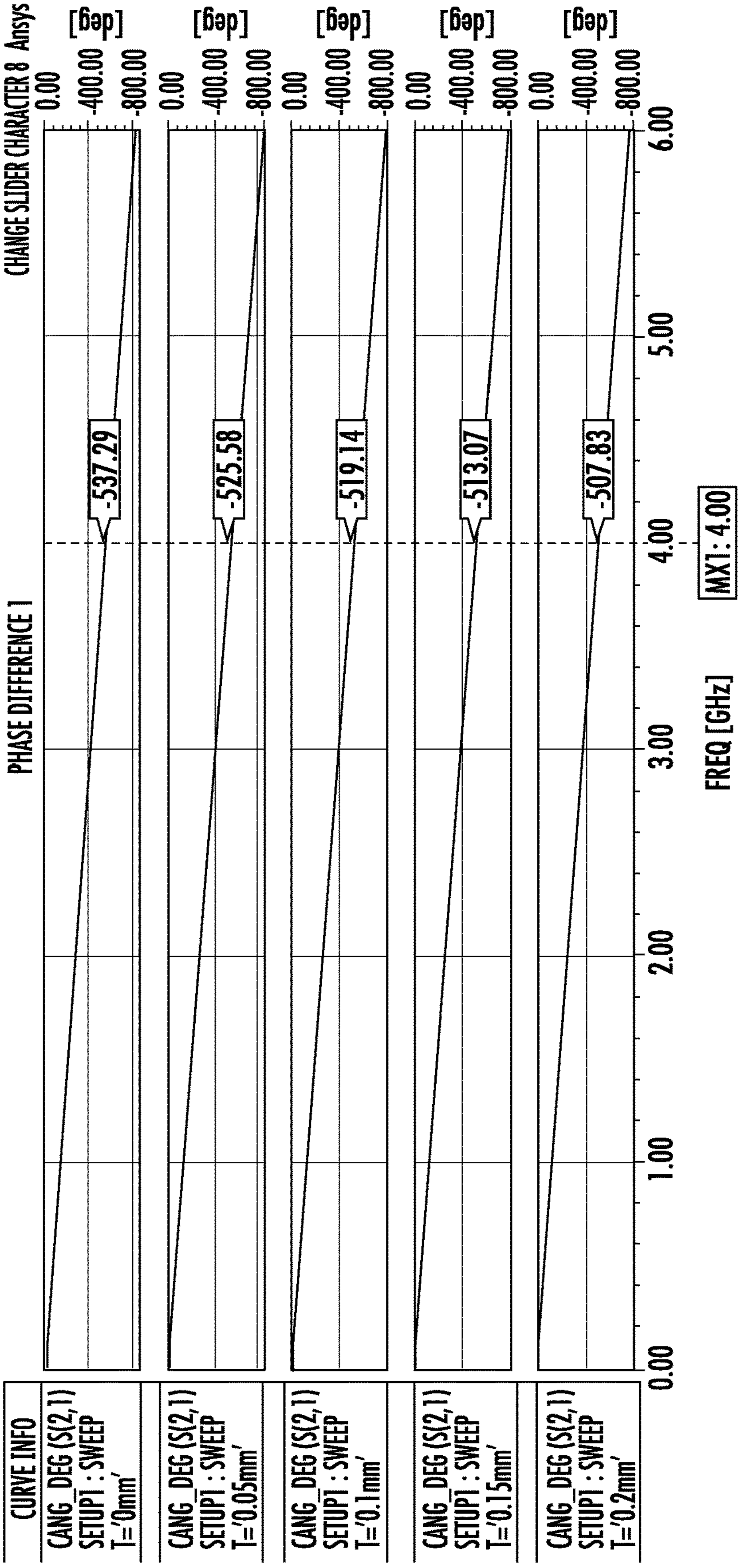
FIG. 9A is a graph of the relationship between the phase deviations of a phase shifter assembly and the dimensional errors of a dielectric element according to the prior art.
Figure 9B:
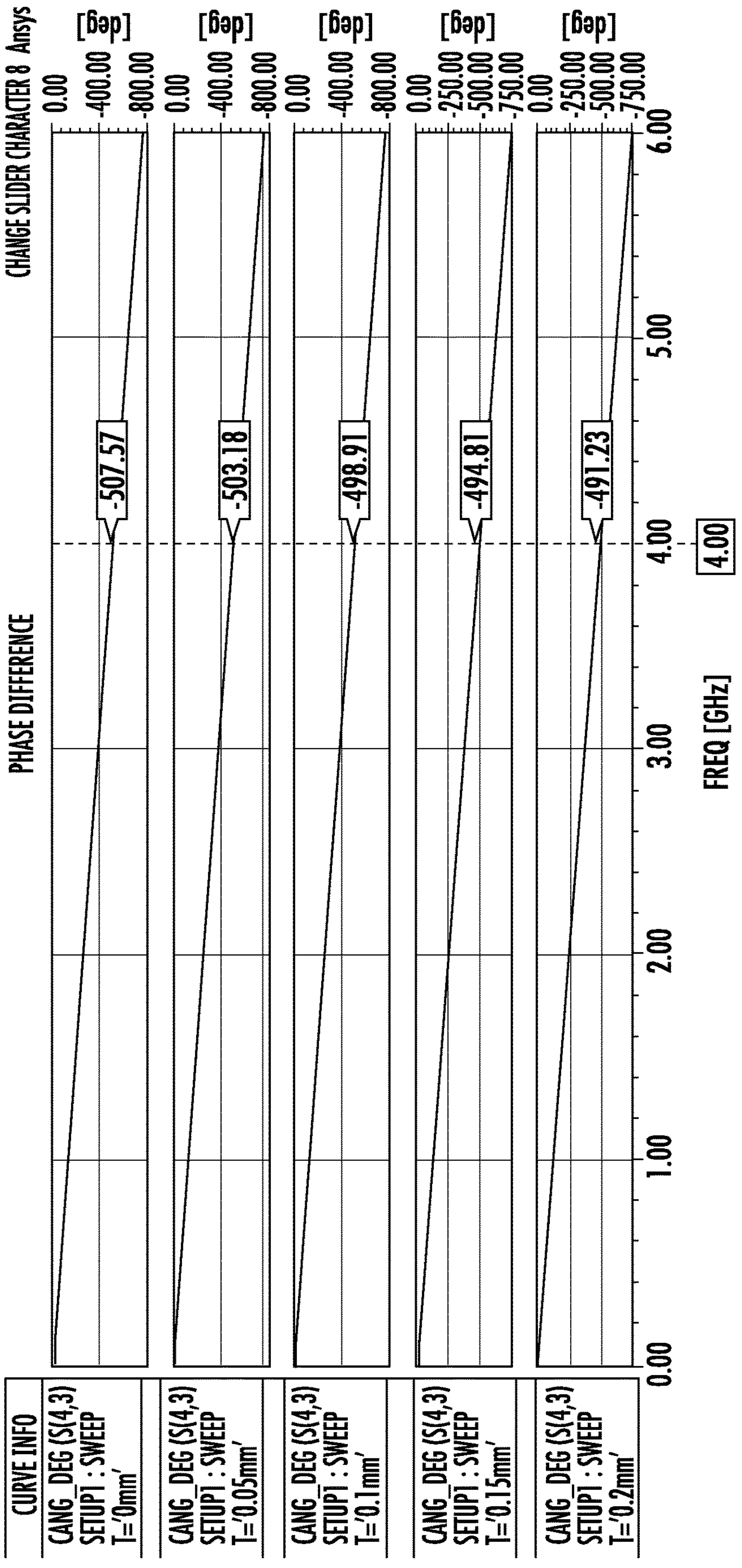
FIG. 9B is a graph of the relationship between the phase deviations of the phase shifter assembly and the dimensional errors of the dielectric element according to the present disclosure.

FIG. 9A shows an exemplary graph of the relationship between the phase deviations of a phase shifter assembly 3 and the dimensional errors of a dielectric element 321 according to the prior art; FIG. 9B shows an exemplary graph of the relationship between the phase deviations of the phase shifter assembly 3 and the dimensional errors of the dielectric element 321 according to the present disclosure.

As shown in FIGS. 9A and 9B, when the dimensional error T of the dielectric element 321 is 0.05 mm, the phase deviation of the phase shifter assembly 3 according to the prior art in the 4 GHz operating frequency band is 537.29-525.58=11.71 deg, while the phase deviation of the phase shifter assembly 3 according to the present disclosure in the 4 GHz operating frequency band is only 507.57-503.18=4.39 deg. It can be seen that the phase shifter assembly 3 according to the present disclosure has better phase stability and thus better phase shifting performance than the phase shifter assembly 3 according to the prior art.

The invention claimed is:

1. A phase shifter assembly, comprising:

a phase shift circuit configured as printed traces on a printed circuit board and a dielectric assembly having at least one dielectric element movable relative to the phase shift circuit for phase shifting, the at least one dielectric element comprising a first dielectric component and a second dielectric component on opposite sides of the phase shift circuit, wherein the first and second dielectric components abut the printed circuit board such that a first intermediate region of the first dielectric component and a second intermediate region of the second dielectric component are disposed at a set distance from the phase shift circuit to form a gap between the at least one dielectric element and the printed traces of the phase shift circuit, wherein a hollow portion for impedance matching is provided in at least one free end region of the at least one dielectric element to expose a part of the phase shift circuit.

2. The phase shifter assembly according to claim 1, wherein the at least one dielectric element is disposed at a set distance from the phase shift circuit over an entire length thereof.

3. The phase shifter assembly according to claim 1, wherein the at least one dielectric element is configured to translationally move relative to the phase shift circuit.

4. The phase shifter assembly according to claim 1, wherein the phase shift circuit is configured as a metal-sheet circuit.

5. The phase shifter assembly according to claim 1, wherein the dielectric assembly has a plurality of dielectric elements arranged in a distributed manner.

6. The phase shifter assembly according to claim 1, wherein the dielectric assembly has at least one impedance-matched dielectric member fixed relative to the phase shift circuit.

7. The phase shifter assembly according to claim 1, wherein, in a direction perpendicular to the phase shift circuit, the gap by which the phase shift circuit is spaced apart from the at least one dielectric element is at least 0.05 mm, 0.1 mm, 0.15 mm, 0.2 mm, 0.25 mm or 0.3 mm.

8. The phase shifter assembly according to claim 1, wherein the at least one dielectric element is spaced apart from the phase shift circuit by a distance greater than a dimensional error of the at least one dielectric element.

9. A cavity phase shifter comprising a phase shifter cavity, wherein the phase shifter assembly according to claim 1 is disposed in the phase shifter cavity.

10. A base station antenna, wherein the base station antenna comprises the cavity phase shifter according to claim 9.

11. A phase shifter assembly, comprising:

a phase shift circuit configured as printed traces on a printed circuit board and a dielectric assembly having at least one dielectric element movable relative to the phase shift circuit for phase shifting, the at least one dielectric element comprising a first dielectric component and a second dielectric component on opposite sides of the phase shift circuit, wherein the first and second dielectric components abut the printed circuit board such that a first intermediate region of the first dielectric component and a second intermediate region of the second dielectric component are disposed at a set distance from the phase shift circuit to form a gap between the at least one dielectric element and the printed traces of the phase shift circuit, wherein the phase shift circuit comprises a first circuit section and a second circuit section, wherein the first circuit section is provided with a first dielectric element movable relative to the first circuit section and the second circuit section is provided with a second dielectric element movable relative to the second circuit section, and wherein the dielectric constant and/or thickness of the first dielectric element is different from the dielectric constant and/or thickness of the second dielectric element.

12. The phase shifter assembly according to claim 11, wherein the at least one dielectric element is disposed at a set distance from the phase shift circuit over an entire length thereof.

13. The phase shifter assembly according to claim 11, wherein the at least one dielectric element is configured to translationally move relative to the phase shift circuit.

14. The phase shifter assembly according to claim 11, wherein the phase shift circuit is configured as a metal-sheet circuit.

15. The phase shifter assembly according to claim 11, wherein the dielectric assembly has a plurality of dielectric elements arranged in a distributed manner.

16. The phase shifter assembly according to claim 11, wherein the dielectric assembly has at least one impedance-matched dielectric member fixed relative to the phase shift circuit.

17. The phase shifter assembly according to claim 11, wherein, in a direction perpendicular to the phase shift circuit, the gap by which the phase shift circuit is spaced apart from the at least one dielectric element is at least 0.05 mm, 0.1 mm, 0.15 mm, 0.2 mm, 0.25 mm or 0.3 mm.

18. The phase shifter assembly according to claim 11, wherein the at least one dielectric element is spaced apart from the phase shift circuit by a distance greater than a dimensional error of the at least one dielectric element.

19. A cavity phase shifter comprising a phase shifter cavity, wherein the phase shifter assembly according to claim 11 is disposed in the phase shifter cavity.

20. A base station antenna, wherein the base station antenna comprises the cavity phase shifter according to claim 10.

* * * * *